United States Patent [19]
Tsukamoto et al.

[11] Patent Number: 5,591,099
[45] Date of Patent: Jan. 7, 1997

[54] SHIFT MECHANISM FOR AUTOMATIC TRANSMISSION WITH LUBRICATING MEANS FOR ONE-WAY CLUTCH

[75] Inventors: Kazumasa Tsukamoto, Toyota; Masahiro Hayabuchi, Anjo; Masanori Kadotani, Nishio; Satoru Kasuya, Hekinan, all of Japan

[73] Assignee: Aisin AW Co., Ltd., Japan

[21] Appl. No.: 442,419

[22] Filed: May 16, 1995

[30] Foreign Application Priority Data

May 16, 1994 [JP] Japan .................................. 6-124697

[51] Int. Cl.⁶ ........................................................ F16H 3/62
[52] U.S. Cl. .......................... 475/318; 475/292; 475/297
[58] Field of Search .................................. 475/318, 297, 475/281, 283, 287, 291, 292

[56] References Cited

U.S. PATENT DOCUMENTS

| | | | |
|---|---|---|---|
| 3,830,082 | 8/1974 | Clauss, Jr. et al. ................. | 64/15 C |
| 4,479,404 | 10/1984 | Stockton ............................ | 74/695 |
| 4,916,980 | 4/1990 | Asada et al. ........................ | 475/281 |
| 5,478,291 | 12/1995 | Morisawa et al. .................. | 475/281 |

FOREIGN PATENT DOCUMENTS

| | | |
|---|---|---|
| 0305045 | 3/1989 | European Pat. Off. . |
| 0616150 | 9/1994 | European Pat. Off. . |
| 3812623 | 11/1988 | Germany . |
| 1-312267 | 12/1989 | Japan ................................. 475/281 |

*Primary Examiner*—Charles A. Marmor
*Assistant Examiner*—Sherry Lynn Estremsky
*Attorney, Agent, or Firm*—Lorusso & Loud

[57] ABSTRACT

A shift mechanism for an automatic transmission includes a frictional engagement element arranged between the case of the automatic transmission and one element of a planetary gear unit and a hydraulic servo unit for engaging the frictional engagement element. A one-way clutch is connected to that same one element of the planetary gear unit for selectively locking it to the case. The one-way clutch is axially spaced from the frictional engagement element with the hydraulic servo unit therebetween. Further, the one-way clutch has its outer race connected to the case and its inner race connected to the aforementioned element of the planetary gear unit through a connection member axially extending along the inner circumferential side of the hydraulic servo unit. The inner race is formed with a radial lubricating oil passage in fluid communication with an oil passage in a transmission shaft.

9 Claims, 2 Drawing Sheets

SHIFT MECHANISM FOR AUTOMATIC TRANSMISSION WITH LUBRICATING MEANS FOR ONE-WAY CLUTCH

BACKGROUND OF THE INVENTION

1. Field of the Invention

The present invention relates to a shift mechanism for an automatic transmission and, more particularly, to a structural combination of a frictional engagement element, a planetary gear unit, a hydraulic servo unit and a one-way clutch.

2. Related Art

In an automatic transmission having a one-way clutch of the free wheel type, one element of a planetary gear unit is disengageably fixed to the case for a shift, in dependence upon the direction of rotation, and is arranged in parallel with a multi-disc brake so that it may establish engine braking when reversely driven. Specifically, a one-way clutch is arranged to have one of its inner and outer races fixed to the case and the other race connected to one element of the planetary gear unit. Likewise, the brake has one frictional engagement element set connected to the case and its other set connected to one element of the planetary gear unit.

In the prior art, in which the one-way clutch and the brake are combined, the one-way clutch has its outer race connected to the carrier of the planetary gear unit to allow the frictional engagement element to be located between the carrier and the case, and has its inner race fixed to the case, as disclosed in Japanese Patent Laid-Open No. 288753/1987. In Japanese Patent Laid-Open No. 126147/1993, on the other hand, there is disclosed another arrangement, in which the one-way clutch has its inner race connected to the ring gear, to allow the frictional engagement element to be located between the ring gear and the case, and its outer race fixed to the case.

In the former type in which the inner race is fixed to the case, the inner race does not rotate, which makes it impossible to use the ordinary lubrication means, involving applying a centrifugal force to the lubricating oil fed from the in-shaft oil passage, to introduce centrifugal oil pressure into the one-way clutch. Thus, there arises the problem that another lubricating oil passage must be formed leading from the case to the inside of the one-way clutch. On the other hand, in a construction having the outer race fixed to the case, the centrifugal oil pressure can be fed into the one-way clutch through a radial lubricating oil passage formed in the inner race and, as a result, the lubrication can be effected by ordinary means of simplified construction. However, the outer race is axially interposed between the piston of the hydraulic servo unit and the frictional engagement element. This makes it necessary to adopt a construction in which the frictional engagement element is axially pressed by a forked member extending from the piston through a hole extending through the outer race, so that the pressure received at the face of the friction member is uneven. In order to compensate for this latter problem, therefore, the operating force must be increased by enlarging the size of the hydraulic servo unit, but this, in turn, decreases the durability of the friction member, thus creating another problem.

SUMMARY OF THE INVENTION

Therefore, an object of the present invention is to provide a shift mechanism for an automatic transmission, which can solve the aforementioned two problems of lubrication and uneven facial pressure against a frictional engagement element.

Another object of the present invention is to provide a structure in which the inner race of the one-way clutch is rotatable and the frictional engagement element is directly engaged by the piston of the hydraulic servo unit.

Yet another object of the present invention is to provide a structure for a planetary gear unit in which the one-way clutch is separated from the frictional engagement element and the hydraulic servo unit.

Still another object of the present invention is to provide a one-way clutch arrangement suited for establishing a high load torque capacity.

In order to achieve the above-specified objects, the present invention provides a shift mechanism including a frictional engagement element arranged between the case of an automatic transmission and one element of a planetary gear unit; a hydraulic servo unit for pushing the frictional engagement element in the axial direction; and a one-way clutch, connected to the one element of the planetary gear unit, for disengageably fixing the same to the case. The one-way clutch is axially spaced from the frictional engagement element with the hydraulic servo unit located axially intermediate the one-way clutch and the frictional engagement element. The one-way clutch has its outer race connected to the case and its inner race connected to the one element of the planetary gear unit through a connection member axially extending along the inner circumferential side of the hydraulic servo unit. The inner race is formed with a radial lubricating oil passage in fluid communication with an oil feed passage in a transmission shaft.

In the automatic transmission shift mechanism of the present invention, moreover, the outer race is fitted in an auxiliary case section made separate from the main case housing the frictional engagement element and the hydraulic servo, with the main case and auxiliary case abutted together and joined.

In the present invention, the one-way clutch is axially spaced from the frictional engagement element with the hydraulic servo unit therebetween. One element of the planetary gear unit is connected to the inner race through a connection member so that the one-way clutch does not obstruct the direct facing relationship between the frictional engagement element and the hydraulic servo unit by which it is operated. As a result, the frictional engagement element does not receive uneven facial engaging pressure and its durability is thereby improved. In the aforementioned construction, the inner race of the one-way clutch is allowed to rotate so that centrifugal oil pressure can be fed via a simple radial oil passage to the one-way clutch.

Thanks to adoption of the aforementioned structural relationship, moreover, the one-way clutch is in a so-called "externally attached relationship" to the planetary gear unit, the frictional engagement element and the hydraulic servo unit, so that the transmission case, lacking provision for the one-way clutch, can be standardized. As a result, the manufacture process can be simplified and effected at a low cost by interchangeability of the main case with that for a transmission of the type having no one-way clutch. Moreover, because the case for the frictional engagement element and the case to which the outer race of the one-way clutch is fixed are separately fabricated, the degree of freedom in designing the latter can allow for maximizing the engaging force of the one-way clutch. Thus, the structural relationship embodied in the combination of the present invention is especially effective if it includes a one-way clutch which is applied in 1st speed to provide a high torque output for the automatic transmission.

DESCRIPTION OF THE PREFERRED EMBODIMENT

Figure 2:
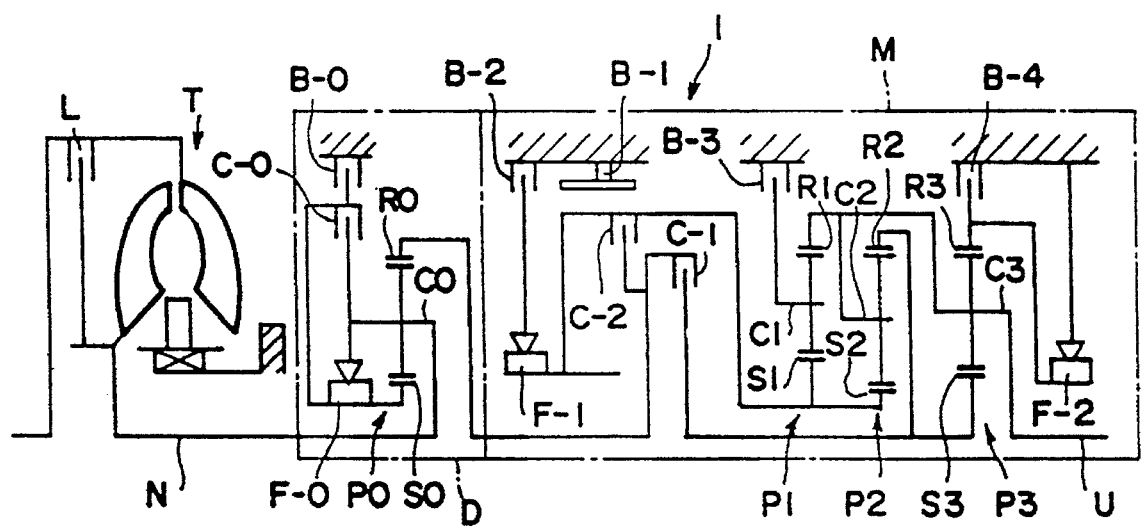
FIG. 2 is a skeletal diagram showing the entirety of the shift mechanism of an automatic transmission including the aforementioned combination.

An embodiment of the present invention will now be described in the following with reference to the drawings. As schematically shown in FIG. 2, an automatic transmission 1 has a five-speed gear change mechanism combining an auxiliary transmission mechanism D, composed of a pre-overdrive planetary gear unit P0, and a main transmission mechanism M, composed of three simply connected planetary gear units for four forward and one reverse speeds. This gear change mechanism is connected to a torque converter T equipped with a lockup clutch L.

The auxiliary transmission mechanism D has a carrier C0 connected to an input shaft N and to a sun gear S0 through a one-way clutch F-0 and a multi-disc clutch C-0 arranged in parallel. These components are engageable with the case through a multi-disc brake B-0. A ring gear R0 connects with the main transmission mechanism M.

The main transmission mechanism M has three sets of gear units P1 to P3 simply connected by direct connections between a sun gear S1 and a sun gear S2, between a sun gear S3 and a ring gear R2, and between a carrier C2 and a carrier C3. The sun gears S1 and S2 are connected to the auxiliary transmission mechanism D through the multi-disc clutch C-2 and are engageable with the casing through a band brake B-1, a one-way clutch F-1 and a multi-disc brake B-2. The sun gear S3 and the ring gear R2 are connected to the auxiliary transmission mechanism D through a multi-disc clutch C-1. A carrier C1 is engageable with the case through a brake B-3, and a ring gear R3 is also engageable with the case through a brake B-4 and through a one-way clutch F-2 in parallel with the brake B-4. The carrier C3 is connected to an output shaft U.

In this automatic transmission 1, the rotational output of the engine (not shown) is transmitted through the torque converter T to the input shaft N of the auxiliary transmission mechanism D. Upon application of the clutch C-0 under control of a hydraulic control unit (not shown), to directly connect the auxiliary transmission mechanism D, and upon application of the clutch C-1 of the main transmission mechanism M, with release of all the remaining frictional engagement elements, rotation of the input shaft N is transmitted to the sun gear S3 of the gear unit P3 so that it is output as 1st speed rotation from the carrier C3 to the output shaft U by preventing the reverse rotation of the ring gear R3 with the one-way clutch F-2.

2nd speed is established when the auxiliary transmission mechanism D is directly connected by application of the clutch C-1 and the brake B-3. At this time, the input rotation to the ring gear R2 of the gear unit P2 is output, using the carrier C1 of the gear unit P1 as a reaction element, to the carrier C2 of the gear unit P2 and the ring gear R1 of the gear unit P1, the two being directly connected, to thereby establish the 2nd speed as output rotation of shaft U. On the other hand, 3rd speed is established when the auxiliary transmission mechanism D is likewise directly connected by application of the clutch C-1 and the brake B-2 while the remaining elements are released. At this time, the input rotation to the ring gear R2 of the gear unit P2 is output, by using the sun gear S2 as a reaction element, to the carrier C2 to thereby establish the 3rd speed as output via shaft U.

4th speed is established when the auxiliary transmission mechanism D is also directly connected by application of both the clutch C-1 and the clutch C-2. At this time, the input is to the ring gear R2 and the sun gear S2 so that the gear unit P2 is directly connected to output the input rotation as is. 5th speed is established, with the main transmission mechanism M being directly connected in 4th speed, by releasing the clutch C-0 and by applying the brake B-0 to fix the sun gear S0, to thereby accelerate the rotation of the auxiliary transmission mechanism D.

Reverse is established, with the auxiliary transmission mechanism D being in the aforementioned state, by applying the clutch C-2 and the brake B-4 of the main transmission mechanism M. At this time, the input to the sun gear S2 of the gear unit P2 is output as reverse rotation of the carriers C2 and C3 of the gear units P2 and P3 by using the ring gear R3 as a reaction element.

Figure 1:
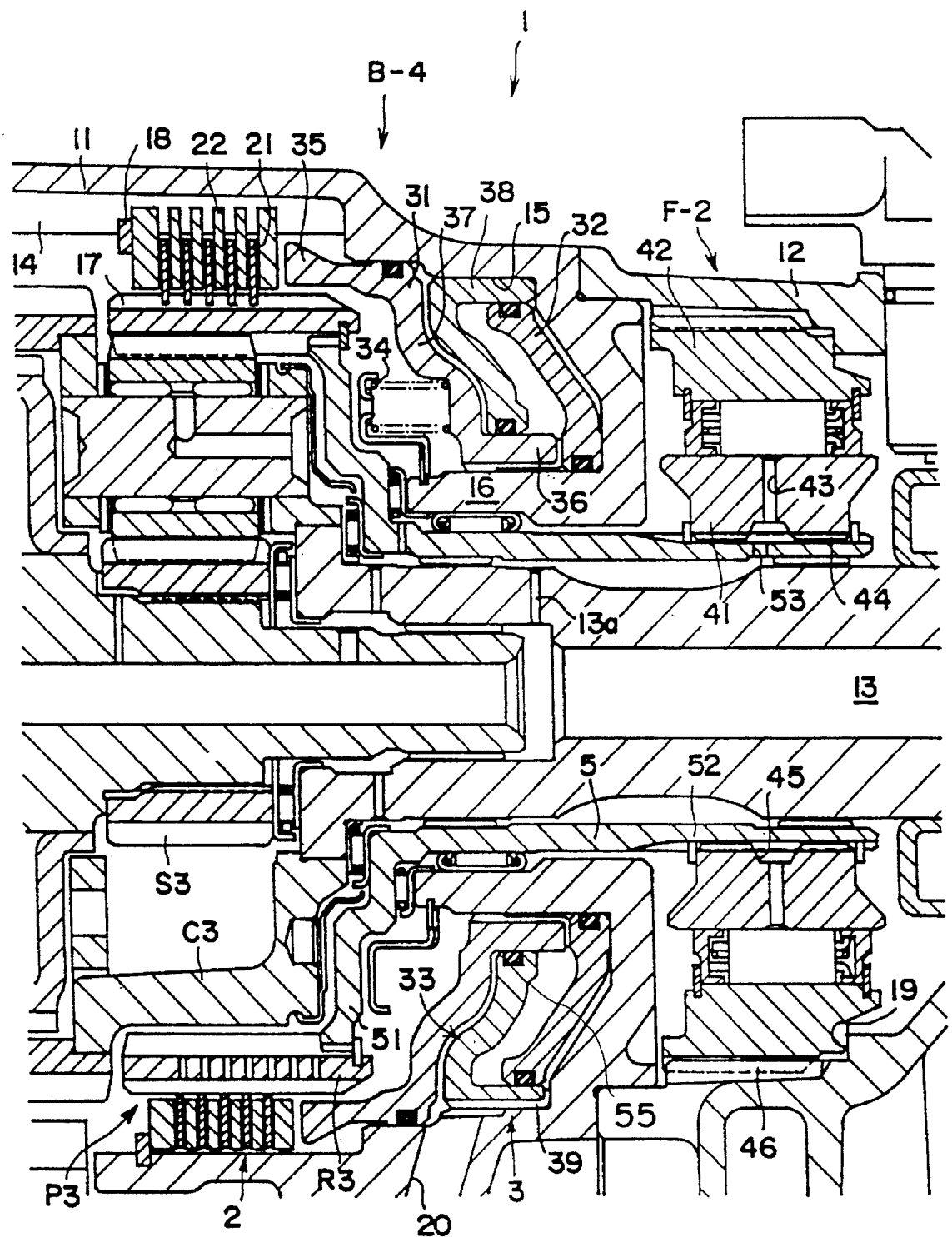
FIG. 1 is a partial, axial cross-sectional view showing the elements of the shift mechanism combination of one embodiment of the present invention.

In the automatic transmission 1 thus constructed, the present invention is applied to the brake B-4 and the one-way clutch F-2, which are associated with the planetary gear unit P3. As shown in FIG. 1, the shift mechanism of the present invention includes a frictional engagement element 2 composed of hub side friction members 21 and case side friction members 22 and arranged between the case 11 of the automatic transmission 1 and the ring gear R3 or one element of the planetary gear unit P3; a hydraulic servo unit 3 for applying axial force to engage the frictional engagement element 2; and one-way clutch F-2 connected to the ring gear R3 of the planetary gear unit P3 for disengageably fixing the same to the case 11. The one-way clutch F-2 is axially spaced from the frictional engagement element 2, with the hydraulic servo unit 3 in between. One-way clutch F-2 has its outer race 42 connected to a case 12 constructed separately from the case 11 and has its inner race 41 connected to the ring gear R3 of the planetary gear unit P3 through a connection member 5 which extends axially along the inner circumference of the hydraulic servo unit 3. Moreover, the inner race 41 is formed with a radial lubricating oil passage 43 in fluid communication with an oil passage 13 in a transmission shaft.

The case 11 is formed with inner splines 14 for mating with, and holding against rotation, the outer splines of the case side friction members 22. The case 11 further defines a cylinder 15 for the two pistons 31 and 32 and an intermediate separator piston 33 fitted therein for sliding, axial movement. On the front end ("front" is used with reference to the input side whereas "rear" has reference to the output side) of an annular portion 16 of case 11, defining the inner side of the cylinder space 15, there is mounted a seat for a return spring 34 which pushes against the piston 31.

As noted above, the frictional engagement element 2 is composed of case side friction members 22 each having a splined outer circumference, and the hub side friction members 21 each having a splined inner circumference. These friction members are alternately arranged and are slidably fitted to the splines 14 and 17, which are individually formed in the brake hubs of the case 11 and the ring gear R3. The frictional engagement element 2 is arranged with its front end abutting a snap ring 18 fixed to a circumferential wall which crosses the splines 14 of the case 11 and its rear end facing the piston 31.

The hydraulic servo unit 3 is of a double-piston construction to give a high engaging force with a limited external diameter. The front piston 31 is constructed of a cylinder portion 35 extending toward the front to define the outer circumference of piston 31 and a cylinder portion 36 extending toward the rear to define the inner circumference of piston 31, with 35 and 36 being integrally connected by a plate-shaped portion 37 having its outer circumferential side inclined forward. The rear piston 32 is formed a plate-like shape with its outer circumferential side inclined forward. Between these two pistons, is mounted the separator piston 33 which has a cylinder portion 38 extending rearward from the outer circumference of an integral plate-like portion 55 which has its outer circumferential side inclined toward the front end. The plate-like portion 55 has its inner circumferential surface engaged by the outer surface of the inner circumferential cylinder portion 36 of the piston 31 and its outer circumferential cylinder portion 38 fitted on the inner cylindrical surface of the cylinder space 15 with their mating sliding surfaces sealed through O-rings.

The one-way clutch F-2 is formed in a free wheel configuration with a roller interposed between the inner race 41 and the outer race 42. The inner race 41 is splined on its inner surface with splines 44 and contains the radial lubricating oil passage 43 which radially extends from a circumferential groove 45 formed across the inner circumferential splines 44. The inner race 41 is splined, through splines 44, to the rear end of the connection member 5, so that the inner race 41 is held against rotation by the connection member 5, and is axially positioned thereon with its two axial end faces axially fixed by snap rings. The outer race 42 is formed with splines 46 on its outer circumferential surface and is held against axial movement by its rear end face abutting against a shoulder or step portion 19 of the case 12.

The connection member 5 is formed in a cylindrical shape with a sleeve shaft portion 52 having one end integrally joined to the inner circumference of a radial flange portion 51. The connection member 5 is splined to the ring gear R3 through splines on the outer circumference of the radial flange portion 51 mating with splines on the internal surface of the ring gear R3. The inner race 41 has its inner splines 44 mating with the splines on the outer circumference of the rear end of the sleeve shaft portion 52. Sleeve shaft portion 52 is formed with a radial oil port 53 which is positioned in alignment with the circumferential groove 45 in the inner race 41.

In the above-described assembly, the hydraulic servo unit 3 operates to establish reverse and to provide engine braking in 1st speed. Responsive to oil pressure fed to the back face of the piston 31, from the oil passage 20 formed in the case 11, and to the back face of the piston 32, via an axial groove 39 formed in the outer circumferential cylinder portion 38 of the separator piston 33, the piston 31 is pushed forward either directly by the oil pressure applied to its pressure receiving face or by piston 32 pushing against its cylindrical portion 36 responsive to oil pressure acting on piston 32. In either event piston 31 pushes evenly against the end face of the frictional engagement element 2, around its entire circumference, with leading end face of the cylinder portion 35, to thereby bring the friction members 21 and 22 into engagement with each other.

The feed of the lubricating oil to the one-way clutch F-2 is directed onto the roller by way of the axial oil passage 13 in the output shaft, the radial oil passage 13a, the space between the output shaft U and the connection member 5, the radial oil passage 53 in the connection member 5, and the circumferential groove 45 and the radial lubricating oil passage 43 of the inner race 41. This oil feed can be smoothly effected by centrifugal force acting upon the lubricating oil in accordance with the rotation of the output shaft U, the connection member 5 and the inner race 41 (excepting at the time of 1st speed engine braking with the brake B-4 applied, when in reverse, and when the 1st speed is established with the one-way clutch F-2 applied).

In short, according to the embodiment thus far described, it is possible at the same time to apply uniform pressure against the brake friction members and to simplify the configuration of the oil circuit for lubricating the one-way clutch F-2. In the above-described embodiment, moreover, the one-way clutch F-2 is disposed external to the main case, unlike the arrangement aforementioned prior art, as disclosed in Japanese Patent Laid-Open No. 126174/1993. The structural arrangement of the present invention allows for the servo for the brake B-4 to be constructed with double pistons 31 and 32 to increase the force applied to the brake B-4 by the servo without increasing the axial dimension of the transmission case 11, thus allowing the number of the friction members of the brake B-4 to be accordingly reduced to lower the dragging torque. Thanks to the external disposition of the one-way clutch F-2, moreover, the transmission case 11 can be standardized, and the manufacture process can be simplified and carried out at a lower cost by making the case 11 also usable for a transmission of the type having no one-way clutch F-2. Moreover, since the case portions for mounting the frictional engagement element 2 (case 11) and for mounting the outer race 42 (case 12) are separate, the increased degree of freedom for designing the mounting of the outer race of the one-way clutch F-2 allows the use of finer splines for mounting the outer race and, in turn, a higher engaging force. In mounting the outer race 42 in the case 12, the need for an axial stopper in the form of a snap ring or the like is eliminated by making use of the abutting end face of the case 12 so that the assembling process is also simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A shift mechanism for an automatic transmission, comprising:

a casing;

a planetary gear unit comprising a plurality of cooperative elements inclusive of a ring gear;

frictional engagement means, housed within said casing for selectively locking one of said elements of said planetary gear unit to said casing;

a hydraulic servo unit for selectively engaging said frictional engagement means, said hydraulic servo unit having an annular configuration defining an inner circumferential side; and a one-way clutch including an inner race, connected to said one element of said planetary gear unit through a sleeve shaft portion of a connection member axially extending along the inner circumferential side of said hydraulic servo unit, and an outer race mounted to said casing whereby said connection member and said inner race rotate with said one element, said one-way clutch being located axially spaced from said frictional engagement element with said hydraulic servo unit mounted therebetween, said inner race defining an inner surface splined to said sleeve shaft portion and having a circumferential oil groove around said inner surface and a radially extending lubricating oil passage therethrough, said lubricating oil passage opening at one end into said oil groove, said oil groove being in fluid communication with a source of lubricating oil through a radially extending oil port in said sleeve shaft portion.

2. An automatic transmission shift mechanism according to claim 1, wherein said casing includes: a main case housing said frictional engagement element, said planetary gear unit and said hydraulic servo unit; and an auxiliary case housing said one-way clutch, and wherein said outer race is mounted to said auxiliary case.

3. An automatic transmission shift mechanism according to claim 1, wherein said one element of said planetary gear unit is said ring gear.

4. An automatic transmission shift mechanism according to claim 1, wherein said sleeve shaft portion is integral with a radial flange portion connected to said ring gear.

5. An automatic transmission shift mechanism according to claim 1, wherein said hydraulic servo unit comprises: a first piston for directly bearing against said frictional engagement means to apply an axial force; a second piston for axial movement into and out of abutting engagement with said first piston; and a cylinder, formed integrally with said casing and slidably supporting said first and second pistons.

6. An automatic transmission shift mechanism according to claim 5, wherein said casing includes: a main case housing said frictional engagement element, said planetary gear unit and said hydraulic servo unit; and an auxiliary case housing said one-way clutch, and wherein said cylinder is integrally formed with said main case.

7. An automatic transmission shift mechanism according to claim 1, further comprising:

a shaft extending through and supporting said connection member, said shaft being connected to an element of said planetary gear unit, and wherein said shaft is formed with a radial oil passage and a longitudinal oil passage providing said fluid communication between said oil groove and said source of lubricating oil.

8. An automatic transmission shift mechanism according to claim 7, wherein said planetary gear unit includes a sun gear, a carrier and said ring gear, and wherein said shaft is connected to said carrier.

9. An automatic transmission shift mechanism according to claim 1, wherein said inner and outer races define an open area therebetween and wherein said lubricating oil passage opens into said open area at its end opposite said one end.

* * * * *